United States Patent [19]
Uhing

[11] 3,725,466
[45] Apr. 3, 1973

[54] PROCESS FOR THE PREPARATION OF PHOSPHORUS COMPOUNDS HAVING AN ALKYL ETHER SUBSTITUENT AND INTERMEDIATES THEREFOR

[75] Inventor: Eugene H. Uhing, Ridgewood, N.J.

[73] Assignee: Stauffer Chemical Company, New York, N.Y.

[22] Filed: Apr. 6, 1970

[21] Appl. No.: 23,095

Related U.S. Application Data

[63] Continuation of Ser. No. 626,977, March 30, 1967, abandoned.

[52] U.S. Cl..............260/502.4 R, 71/87, 252/48.2, 260/435 R, 260/446, 260/606.5 P, 260/927, 260/936, 260/999
[51] Int. Cl.............................C07f 9/30, A01n 9/36
[58] Field of Search.......................260/333, 502.4 R

[56] References Cited

UNITED STATES PATENTS

| | | | |
|---|---|---|---|
| 3,400,135 | 9/1968 | Polak et al. | 260/333 |
| 3,156,701 | 11/1964 | Rocklin | 260/333 |
| 3,285,954 | 11/1966 | Uhing et al. | 260/502.4 R |

Primary Examiner—Howard T. Mars
Assistant Examiner—Joseph E. Evans
Attorney—Robert C. Sullivan, Donald M. MacKay and Paul J. Juettner

[57] ABSTRACT

A process for the preparation of compounds of the formula:

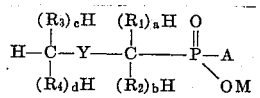

wherein $R_1$, $R_2$, $R_3$, and $R_4$ are hydrocarbylene groups, $a$, $b$, $c$, and $d$ are 1 or 0, Y is a chalcogen, A is, hydrocarbyloxy, hydrocarbyl, or OM and M is an alkaline metal. Preparation is effected by reacting an organic phosphorus compound of the formula:

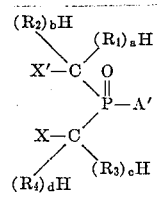

wherein X is halogen and X' is halogen or hydroxyl wherein A' is hydroxyl, hydrocarbyloxy, hydrocarbyl, or OM and M is an alkaline metal, with an amount greater than 2 moles of a basic compound MYH. The reaction is conducted at a temperature of from 0° to 150° C. A can also be hydroxyl when the final product is acidified subsequent to its preparation.

Novel intermediate cyclic ether compounds of the formula:

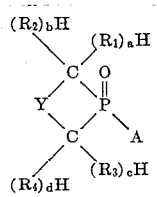

are also prepared by the same process by reacting the corresponding reactant wherein X' is hydroxyl and basic compound MYH is used in an amount of from about 1 to about 1.2 moles.

Preferred embodiments include X as chlorine, Y as oxygen, and M as sodium.

2 Claims, No Drawings

PROCESS FOR THE PREPARATION OF PHOSPHORUS COMPOUNDS HAVING AN ALKYL ETHER SUBSTITUENT AND INTERMEDIATES THEREFOR

This application is a continuation of Ser. No. 626,977 filed Mar. 30, 1967 and now abandoned.

The present invention relates to a process for the preparation of alkyl ether substituted phosphorus compounds, such as the phosphinates and phosphonates, from the corresponding bis-chloroalkyl phosphorus compounds or derivatives thereof. More particularly, this invention relates to a process for the preparation of alkyl ether substituted phosphorus compounds, wherein the ether moiety is a chalcogen from a corresponding bis-chloroalkyl phosphorus compound or derivative chloroalkyl chalcoalkyl phosphorus compound, under basic conditions to produce an intermediate cyclic ether which can be subsequently cleaved to form the product compounds of this invention.

The alkyl ether substituted phosphorus compounds prepared by the method of this invention find utility as biocidally active compounds particularly in the area of insecticides and fungicides, and also as sequestrants. The intermediate cyclic ether derivatives of this invention find utility as monomer precursors for phosphorus containing polymers, copolymers with other copolymerizable monomers, chain terminators and reactants. These intermediate compounds also demonstrate biological activity. The polymeric compounds of this invention also exhibit sequestering properties.

In accordance with the present invention, it has been found that alkyl ether substituted phosphorous compounds are prepared through the reaction of a bis(chloro-alkyl)phosphinic acid, bis-(chloroalkyl) phosphine oxides or phosphinates with an alkaline metal salt of a chalcogen under basic reaction conditions.

The reaction mechanism involved in the present invention can be illustrated diagrammatically as shown below assuming, for simplicity, that the hydroxyl form of A' is already neutralized with an alkali metal salt compound:

Reaction Diagram I

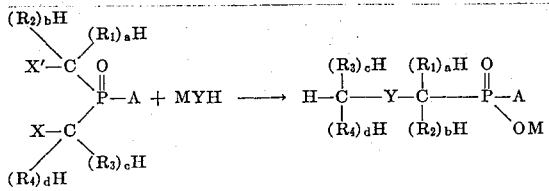

In Reaction Diagram I above, $R_1$, $R_2$, $R_3$ and $R_4$ are hydrocarbylene groups containing from 1 to 18 carbon atoms inclusive, X is a halogen atom, X' is halogen or hydroxyl, A is, a hydrocarbyloxy radical containing from one to 18 carbon atoms (—OR) such as alkyloxy, a hydrocarbyl radical containing from one to 18 carbon atoms (—R), or a metal salt compound OM, wherein M is an alkaline metal, $a$, $b$, $c$ and $d$ are integers having a value of from 0 to 1 inclusive.

As indicated above, each instance of R, i.e., $R_1$, $R_2$, $R_3$ and $R_4$ are hydrocarbylene groups containing from one to 18 carbon atoms. Illustrative of such hydrocarbylene groups are the alkylene groups such as methylene, ethylene, propylene, butylene, hexylene, heptylene, octylene, nonylene, decylene, undecylene, dodecylene, hexadecylene, octadecylene, and the like. Preferred, however, in this category are the lower alkylene groups containing from one to four carbon atoms inclusive. Also included within the term hydrocarbylene groups are the cycloalkylene groups such as cyclopropylene, cyclohexylene, cyclopentylene, cyclobutylene and the like. Additionally included within this term are the arylene groups such as phenylene, biphenylene, naphthylene and the like. Included under the arylene are also the alkarylene and the aralkylene groups such as tolylene and styrene groups.

Included within the term halogen and illustrative thereof are fluorine, chlorine, bromine and iodine.

Illustrative of the chalcogens are oxygen, sulfur, selenium and tellurium, although it is preferred that the chalcogen have a molecular weight less than 40 that is that Y be oxygen or sulfur and preferably oxygen of these two.

The alkaline metals as represented by M in Reaction Diagram I above are the alkali and alkaline earth metals as represented in Group 1A and 2A of the periodic table of the elements. Illustrative of the alkali metals are lithium, sodium, potassium and the like. Illustrative of the alkaline earth metals are beryllium, magnesium, calcium, strontium, barium and the like. Because of the low cost involved it is of course preferred to use sodium as the alkaline metal when such is used in this reaction. It should be noted that the group OM can be converted to a Group A as well as converting the Group OM to OH by acidification of the salt product. It is similarly possible to form esterification products by effecting the reaction in an alcoholic media or utilizing a lower alkoxide. Other various derivatives of these compounds can also be prepared, through the use of different reactants and conditions.

Further, in respect to the hydrocarbylene groups R, when R is an aliphatic group, this group may contain oxygen or sulfur in the forms of ethers, ketones, carboxyl groups or hydrocarbon substituents on the aliphatic chain, but the chalcogenic functional groups should be separated from the phosphorous atom by at least one carbon. R may also contain halogens which are deemed inert if they are removed from the phosphorous beyond at least the beta carbon atom. Alcohols and amines of course cannot be used since such substituents are reactive. When R is aromatic, it can be substituted by halogens in any position. Similarly, other hydrocarbon groups can be substituted.

It has been found that the reaction as set forth and illustrated in Reaction Diagram I above actually runs through several steps, as indicated by Reaction Diagram II below:

Reaction Diagram II

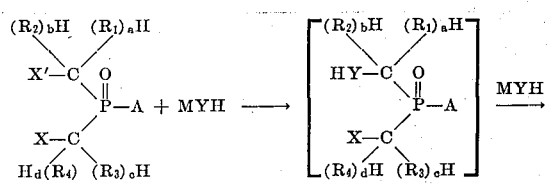

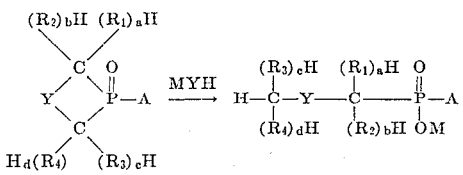

wherein X, X', R₁, R₂, R₃, R₄, a, b, c, d, A, M and Y have been defined above.

Cyclic intermediate compounds indicated in Reaction Diagram II can be isolated and can be used in a separate step to prepare the end product of the reaction diagram. These compounds are also useful as monomers in the preparation of polymers and copolymeric materials and for other uses. It is preferred, however, to prepare the cyclic intermediate from the reactant wherein X' is hydroxyl otherwise the reaction conditions necessary to hydrolyze the halogen group are generally sufficient to favor production of the end product ether.

For convenience in the specification hereinafter, compounds illustrating this process shall be those wherein integers a, b, c and d are 0, M is sodium, Y is oxygen, and halogens are chlorine. It is to be understood, however, that this is for convenience and understanding only and is not intended to limit the scope of this invention.

By way of illustration, the compounds can be prepared by the process of this invention by charging a bis-(chloromethyl)phosphinic acid to a suitable reaction chamber with a suitable basic compound. In the present instance wherein Y is oxygen the alkali metal or alkaline earth metal hydroxides can be used. It will be appreciated that wherein Y is another chalcogen such as sulfur, suitable alkali metal or alkaline earth metal sulfides, selenides, or tellurides can be used. It should be noted, however, that while ammonium is generally deemed to be equivalent with the alkali metal ions, it is not in the present case, and it is hereby excluded as a suitable hydroxide.

The basic compound MYH, such as sodium hydroxide, is effectively used in amounts dependent upon the starting material and the product desired. For example, when bis-(chloromethyl)phosphinic acid is used, 4 to 4.5 moles of sodium hydroxide are required to form sodium methoxymethyl phosphonate. When hydroxymethyl-(chloromethyl)phosphinic acid is used and the product desired is the cyclic ether, then from 2 to 2.2 moles of sodium hydroxide are used. When more than 3 moles of sodium hydroxide are used per mole of the hydroxymethyl-(chloromethyl)phosphinic acid, then the methoxymethylphosphonic acid salt is obtained. The total amount of base MYH utilized depends upon whether or not the starting compound is an acid or not. If it is an acid, then an adjustment in the amounts must be made to neutralize the acid before the reaction can proceed. Similarly, if the bis-chloromethyl or bis-chloroalkyl compound is utilized, a sufficient amount of base must be added to adjust the reaction medium to remove one of the chlorine atoms and form the monochloro-monohydroxy species.

After the base has been charged to the reaction mixture, reaction is heated to a temperature of from about 0° to about 150° C., although it is preferred to use temperatures in the range of from about 20° to 100° C.

Suitable inert solvents or diluents can be effectively used in the conduct of this process. It has been found most desirable to utilize polar solvents such as water and alcohols. Water is, of course, the preferred reaction medium for obvious reasons. Illustrative of suitable solvents include alcohols, containing from one to 12 carbon atoms, diethyl ether, dioxane, tetrahydrofuran, acetonitrile and the like.

While not necessary, this reaction can be conducted at pressures other than atmospheric, for example, it can be conducted at subatmospheric pressure or superatmospheric pressure. For obvious reasons, however, atmospheric pressure is preferred.

By way of illustration, the cyclic ether is formed as follows. After treating

Formula I 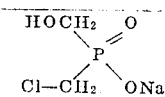

as a representative compound with one equivalent of aqueous sodium hydroxide at a temperature of from about 60° to 80° C. to form Formula II 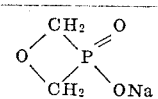

The solution is cooled to a temperature of about 10° C. and approximately one equivalent of dilute (5 to 10 percent) hydrochloric acid is added to form the cyclic ether acid of the formula Formula III 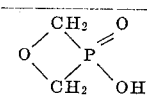

The solvent is effectively removed by reducing the pressure of the reaction vessel to approximately 10 to 20 millimeters of mercury at a temperature of 20° to 40° C. and is finally dried at a temperature of about 20° C. and a pressure of 1 millimeter of mercury pressure. This recovered product is dissolved in acetone at a temperature of about 10° to 15° C. and the resultant mixture is filtered. The sodium chloride formed in the reaction is removed as an insoluble precipitate. The filtrate is evaporated again at reduced pressure approximately 10 to 20 millimeters of mercury at temperatures on the order of 10° to 15° C. The cyclic product is obtained after all the solvent is evaporated. It must be maintained at a temperature of about −20° to 0° C. to prevent reaction with itself. The product is a colorless liquid. Similarly, the preparation of methoxymethylphosphonic acid is described as illustrative of the present process. After treatment of the compound of Formula I

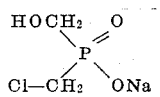

or the corresponding bis-chloro analog with an excess of aqueous sodium hydroxide at a temperature of about 80° C. to about 105° C., the solution is acidified by adding 37 percent hydrochloric acid to convert all sodium hydroxide salts to sodium chloride. Solution is then evaporated to dryness at reduced pressure. The product is extracted from the salt by adding cold hydrochloric acid solution and the insoluble sodium chloride is removed by filtration. It is similarly possible to remove the sodium chloride through the use of alcohols or ketones as solvents. The filtrate is evaporated to remove the solvent, the product is a colorless liquid.

As indicated earlier, the cyclic compound can be polymerized to form a polymer and similarly can be copolymerized with such compounds as ethylene oxide, propylene oxide, 1,3-propylene oxide, or other copolymerizable monomer to form polymers. The homopolymerization proceeds as illustrated in Reaction Diagram III below.

Reaction Diagram III

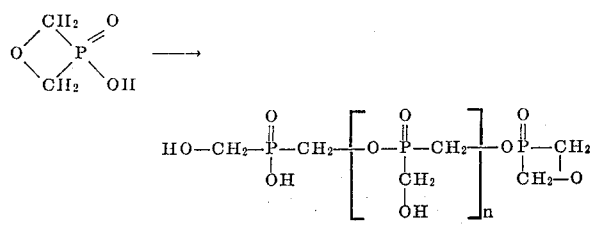

wherein $n$ indicates the number of repeating units. This polymerization reaction is self-catalyzed and other catalysts or catalyst systems are not necessary. However, if a high molecular weight polymer is desired, a Friedel-Crafts type catalyst can be utilized including aluminum chloride, stannic chloride, ferric chloride, boron trifluoride, antimony pentafluoride, phosphorous pentafluoride, and the like. While the cyclic ethers indicated above were acidic, those cyclic ethers which are not acids provide more desirable polymeric polyether products. This is especially true wherein the phosphorous hydroxide acid moiety of the starting material of Reaction Diagram III were replaced by OR or R wherein R is a hydrocarbyl group. The number of repeating units represented by $n$ is generally on the order of 5 to 100. However, higher repeating units can be formed through the use of optimum conditions.

When the compounds are to be utilized as polymeric products or monomeric reactants to enhance the flame retardant properties of other polymers, it has been found that antimony salts which are known fire retardants can be utilized to form salts with the phosphoric acid moiety and further enhance the fire retardancy of these compositions.

In the examples below and throughout the specification all parts and percentages given are by weight unless otherwise specified. The examples which follow serve to illustrate this invention.

EXAMPLE 1

Preparation of

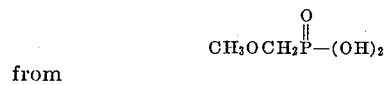

from

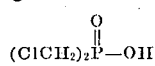

A solution of 32.6 grams $$(ClCH_2)_2\overset{O}{\overset{\|}{P}}-OH$$

(0.2 mole) in 70 grams of water is added dropwise to a refluxing solution of 140 grams of water and 40 grams of sodium hydroxide (1.0 mole). The addition time is about 1 hour. This solution is kept at reflux for about 16 hours. Then 59 milliliters of 37 percent hydrochloric acid is added (0.7 mole). The solution is evaporated to remove all solvent. Then 200 milliliters of 37 percent hydrochloric acid is added and the mixture is filtered to remove the insoluble sodium chloride. The filtrate is evaporated down to give 23,0 grams of product (91.4 percent yield for $CH_3OCH_2PO_3H_2$).

Analysis   23.1% P; 0.35% Cl
Theoretical   24.6% P; nil Cl

The product is a thick colorless syrup. It titrates as a dibasic acid of molecular weight 127. Theory is 126.
The NMR spectra confirms structure.

EXAMPLE 2

Preparation of

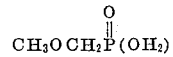

from chloromethyl-(hydroxymethyl) phosphinic acid

A solution of 28.8 grams of

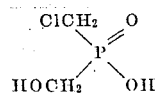

(0.2 mole), 130 grams of water, and 40 grams of sodium hydroxide (1 mole) is heated at about 95° to 100° C. for about 1 hour. Then 66 milliliters of 37 percent hydrochloric acid (0.8 mole) is added and the solution is evaporated to remove solvent. Then 200 milliliters of 37 percent hydrochloric acid is added and the mixture is filtered to remove the insoluble sodium chloride. The filtrate is evaporated to give 21.1 grams of product or 86 percent theory for $CH_3OCH_2PO_3H_2$.

The product is purified by forming a lead salt and washing with $H_2O$. The free acid is regenerated by adding hydrogen sulfide and removing the lead sulfide formed.

Yield of purified product 19.6 grams.
Analysis 23.8% P; 12.8% O as ether O.
Theory for product 24.6% P; 12.7% O as ether O.
Product titrates as dibasic acid having a molecular weight of 127.
Theoretical molecular weight is 126.
Same NMR as product made in No. 1.

EXAMPLE 3

Preparation of

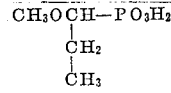

A solution of 15 grams of

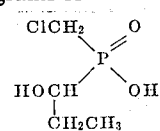

(0.08 mole) in 25 grams of water adjusted to a pH of 9 with aqueous sodium hydroxide is added dropwise to a solution of 25 grams of water and 12 grams of sodium hydroxide (0.3 mole) at a temperature of from about 90° to 100° C. in a period of about 15 minutes. The solution is then heated at reflux (100° - 102° C.) for about 30 minutes. Then 34 milliliters of 37 percent hydrochloric acid (0.4 mole) is added and the solution is evaporated. The residue is extracted with 100 milliliters of 37 percent hydrochloric acid and the insoluble sodium chloride is removed by filtration. The filtrate is evaporated to give 11 grams of crude product or 83 percent theory for

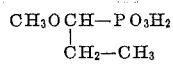

The product is purified by forming an insoluble lead salt and washing. The free acid is regenerated by adding hydrogen sulfide.

Yield 7.3 grams.
Analysis      23.0% P; 2.8% Cl
Theoretical   20.2% P; nil Cl

Product titrates as dibasic acid of molecular weight 148.

Theoretical molecular weight is 154.

The structure of product is based on analysis of its NMR spectra.

EXAMPLE 4

Cyclic Product and Polymer

A solution of 28.8 grams of

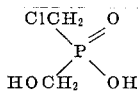

in 500 milliliters of water is made basic by adding 200 milliliters of 1 Normal sodium hydroxide. The reaction is heated to a temperature of about 95° to 100° C. and another 200 milliliters of 1 Normal sodium hydroxide is added slowly over a 5 ½ hour period. The solution is evaporated under vacuum.

Yield of

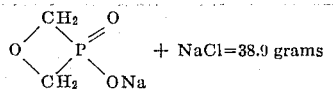

Analysis 15.3% P; 17.8% Cl (total) 17.75% ionic Cl.
Ratio of P:Cl is 1:1.
Paper chromatographic analysis shows product is not starting material or $CH_3OCH_2PO_3Na_2$. The $R_f$ of product resembles a phosphinic acid.
The NMR spectra confirms structure.
Conversion to free

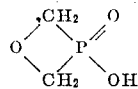

and polymer. A solution of 30.6 grams of

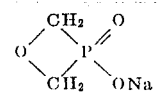

+ sodium chloride (from example above) (0.155 mole based on P analysis) in 150 milliliters of water at about 1° – 2° C. is treated with 39 milliliters of 4 Normal hydrochloric acid. The solution is evaporated at 10 – 20 millimeters of mercury pressure at a temperature of 20° to 40° C. Then 200 milliliters of cold acetone is added. The mixture is filtered to remove sodium chloride. The filtrate is evaporated under vacuum at a temperature of about 10° to 15° C. to give 18 grams of a liquid product.

The crude product titrates as a mono-basic acid having a molecular weight of 126.

Theoretical molecular weight of 126.

Dry (over $P_2O_5$) (at 25° C.) gives a yield of 16.7 grams.

Theoretical yield is 16.75 grams.

Neutralization equivalent after drying is 226.

Drying at a temperature of 100° C. at 1 millimeter of mercury pressure showed no weight loss. Neutralization equivalent found was 306.

After further heating, the product polymerized to a thick syrup confirmed by nuclear magnetic resonance.

EXAMPLE 5

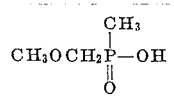

A solution of 58 grams of

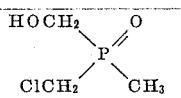

(0.41 mole) in 50 grams of water is reacted with a slurry of 12.5 grams of calcium oxide in 100 grams of water at a temperature of about 80° to 100° C. The reaction is completed by adding 8.0 grams of sodium hydroxide (0.2 mole) in 50 grams of water and heating. Another 16 grams of sodium hydroxide is added and the calcium hydroxide which forms is removed by filtering. The solution is treated with 84 milliliters of 37 percent hydrochloric acid and evaporated. The residue is extracted with 200 milliliters of 37 percent hydrochloric acid and the insoluble sodium chloride is filtered off. The filtrate is evaporated to give 45 grams of product.

Theoretical yield is 49.6 grams.
Analysis      24.6% P; 1.1 Cl
Theoretical   25.0% P; nil Cl Product is a liquid having an index of refraction of $N_D^{25}$ 1.4553 and titrates as monobasic acid having a molecular weight of 126.

Theoretical molecular weight is 124.

Nuclear magnetic resonance confirms structure.

EXAMPLE 6

A solution of 28.8 grams of

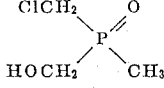

(0.203 mole) in 100 milliliters of ethanol is heated to reflux and 150 milliliters of ethanol reacted with 5.05 grams of sodium (0.22 mole) is added dropwise. The solvent is removed by evaporation. The product is extracted from sodium chloride with 100 milliliters of diethyl ether. After filtering to remove sodium chloride, the filtrate is evaporated.

Crude yield 14.5 grams (liquid).

The product was purified by distillation.

B.P. 0.3 millimeters of mercury pressure 80° C.
Refraction index $N_D^{25}$ 1.4350.

Analysis   20.05% P; 0.56% Cl
Theoretical   20.04% P; nil Cl for 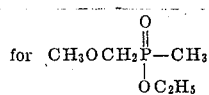

EXAMPLE 7

Preparation of

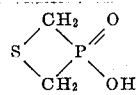

A solution of 35 grams

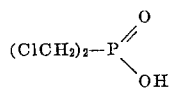

(0.215 mole), 100 grams of water, 8.6 grams of sodium hydroxide (0.215 mole) and 17.2 grams of sodium sulfide (0.22 mole) is heated slowly to a temperature of about 60° C. in about 1 hour. The solution is then heated to reflux (100° to 102° C.) for about 2 hours. Then 19.5 milliliters of 37 percent hydrochloric acid is added (0.23 moles) and the solution is evaporated to remove the solvent. To this is added 100 milliliters of 37 percent hydrochloric acid and the mixture is filtered to remove insoluble sodium chloride. Lead acetate is added to precipitate and dibasic acids present as impurities which are removed by filtration. The filtrate is evaporated to yield a solid, colorless product at a yield of about 21 grams.

Analysis 24.1% P; 22.2% S
Theory for

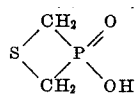

25.0% P; 25.8% S
M.P. 98°–100°

Product titrates as monobasic acid of correct molecular weight.

NMR spectra — shows a single sharp line.
Product has same structure as

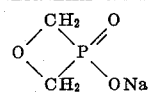

except S replaces O in the 4 member ring.

In the case wherein Y is sulfur, it has been found that the sulfur can exhibit a rank of from about 1 to about 6. That is compounds of the formula:

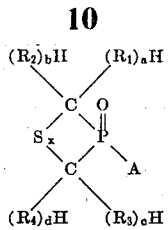

wherein all variables except $x$ have been heretofore defined and $x$ is an integer having a value of from about 1 to about 6. These compounds are prepared in a manner similar to the sulfur analogs except that an alkali polysulfide, such as a sodium polysulfide, i.e., $Na_2S_x$ is used instead of sodium sulfide. The other reaction conditions remain essentially the same.

These compounds are useful in lubricating oils, as rubber vulcanizing agents and as sulfur plasticizers. These higher sulfur rank compounds are also susceptible to polymerization.

EXAMPLE 8

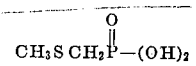

A solution of 1 gram

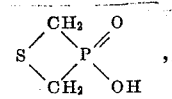

20 grams of water and 6 grams of 50 percent aqueous sodium hydroxide is heated to reflux (100° C to 105° C.) for a period of 6 hours. From this reaction is isolated a dibasic acid having the structure $$CH_3SCH_2\overset{O}{\overset{\|}{P}}-(OH)_2$$

based on its NMR spectra (the NMR spectra resembles that of the oxygen analog formed of Examples 1 and 2).

I claim:

1. As a new composition of matter, a compound having the formula:

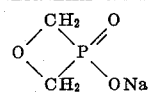

2. As a new composition of matter, a compound having the formula:

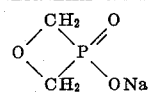

* * * * *